United States Patent [19]

Pendleton et al.

[11] Patent Number: 4,696,787
[45] Date of Patent: Sep. 29, 1987

[54] MONITORING PRESSURE WITHIN A VESSEL

[75] Inventors: Eric Pendleton, Culcheth; Karl A. Roberts, Warrington; Alan Murray, Roby Merseyside, all of England

[73] Assignee: National Nuclear Corporation Limited, London, England

[21] Appl. No.: 731,036

[22] Filed: May 6, 1985

[30] Foreign Application Priority Data

May 21, 1984 [GB] United Kingdom ............. 8412981

[51] Int. Cl.$^4$ .................. G21C 17/06; G01K 13/02
[52] U.S. Cl. .................... 376/247; 376/272; 376/250; 376/251
[58] Field of Search ........... 73/49.3, 52, 722, 729; 376/272, 247, 250, 251, 450

[56] References Cited

U.S. PATENT DOCUMENTS

| 3,107,531 | 10/1963 | Stevens | 374/176 |
|---|---|---|---|
| 3,823,068 | 7/1974 | Worlton et al. | 376/251 X |
| 3,846,235 | 11/1974 | Jones et al. | 376/450 |
| 3,846,795 | 11/1974 | Jones | 376/245 |
| 3,848,466 | 11/1974 | Dial et al. | 374/163 |
| 3,991,622 | 11/1976 | Oowada | 73/49.3 |
| 4,319,958 | 3/1982 | Fica et al. | 376/247 |
| 4,484,173 | 11/1984 | Everett | 73/722 X |
| 4,524,624 | 6/1985 | Di Noia et al. | 73/722 X |
| 4,576,781 | 3/1986 | Duncombe et al. | 376/247 |

FOREIGN PATENT DOCUMENTS

| 88270 | 2/1983 | European Pat. Off. |  |
| 2025621 | 1/1980 | United Kingdom | 376/247 |
| 2063486 | 6/1981 | United Kingdom . |  |
| 2073888 | 10/1981 | United Kingdom . |  |
| 2119932 | 11/1983 | United Kingdom . |  |

Primary Examiner—Paul A. Bell
Attorney, Agent, or Firm—William R. Hinds

[57] ABSTRACT

A vessel for the long term storage and monitoring of nuclear fuel materials incorporates a device (12) within its interior for providing an externally detectable signal indicating whether any pressure loss has occurred. The device (12) comprises a magnet (32) attracted towards a boundary wall (11) of the vessel and urged in that direction by the internal pressure within the vessel acting on a diaphragm (26). The magnet (32) is subjected to oppositely directed forces by pressurized fluid in chamber (40) bounded by diaphragm (26) and a spring (30), the arrangement being such that these latter forces collectively or individually are effective to drive the magent (32) away from the wall (11) in the event of a pressure loss within the vessel thereby producing an externally detectable change in magnetic flux.

20 Claims, 9 Drawing Figures

MONITORING PRESSURE WITHIN A VESSEL

BACKGROUND OF THE INVENTION

This invention relates to the monitoring of pressure within a vessel and is particularly concerned with vessels which are used for the long term storage of irradiated nuclear fuel materials, for example fuel sub-assemblies after withdrawal from liquid metal cooled fast breeder reactors. The interiors of such vessels are pressurised to restrict the release of for example fission gases from the sub-assemblies.

In detecting a gas leak from a pressurized container it is known to directly measure the loss of pressure in the container. This requires access to the interior of the container which may be difficult and expensive and may increase the risk of loss of pressure. It is also known to measure particles of gas or material which have leaked from the container which may be difficult to achieve because of difficulty in obtaining access to and control of the leaking gas or material, or because of the low rate of leakage.

The object of the present invention is to provide a pressurised vessel with means for reliably indicating a significant change in internal pressure over long periods of time.

FEATURES AND ASPECTS OF THE INVENTION

According to one aspect of this invention there is provided a vessel provided internally with a device for enabling external detection of pressure drop within the vessel, said device comprising a permanent magnet, means mounting the magnet within the vessel for movement toward and away from a boundary wall of the vessel, means for translating the internal pressure within the vessel into a force which urges the magnet into a predetermined position with respect to said boundary wall of the vessel and means responsive to the internal pressure for urging the magnet away from said predetermined position whereby, in the event of a substantial drop in pressure within the vessel, the latter means becomes effective to displace the magnet relative to said boundary wall to vary the magnetic field strength detectable by detector means located on the external side of the boundary wall.

According to another aspect of this invention there is provided a storage and monitoring facility for spent nuclear fuel material comprising at least one vessel as defined above and detector means external to the vessel and responsive to changes in magnetic flux caused by movement of said permanent magnet relative to said boundary wall of the vessel.

The detector means may comprise a Hall effect transducer responsive to the magnetic field produced externally of the vessel by the permanent magnet means.

The detector means may alternatively comprise means for generating a time-varying magnetic flux in said boundary wall of the vessel which interacts with the magnetic flux of the permanent magnet, and means for sensing magnetic flux external to said boundary wall.

The permanent magnet may be mounted for movement in a sealed chamber pressurized to a predetermined pressure, the magnet being connected to a member, such as a diaphragm or bellows, movable in response to change in pressure in the vessel from the predetermined pressure.

DESCRIPTION OF THE DRAWINGS

The invention may be performed in various ways and one specific embodiment with possible modifications will now be described by way of example with reference to the accompanying diagrammatic drawings, in which.

DESCRIPTION OF THE PREFERRED EMBODIMENTS

Figure 1:
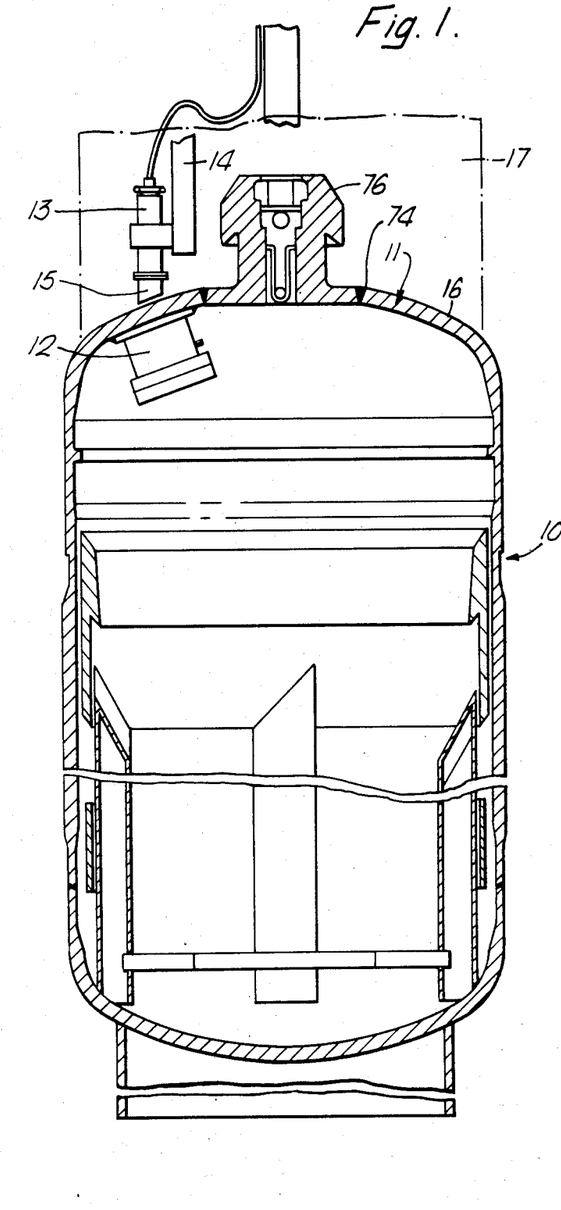
FIG. 1 is an axial section through a storage container with a detector.
Figure 2:
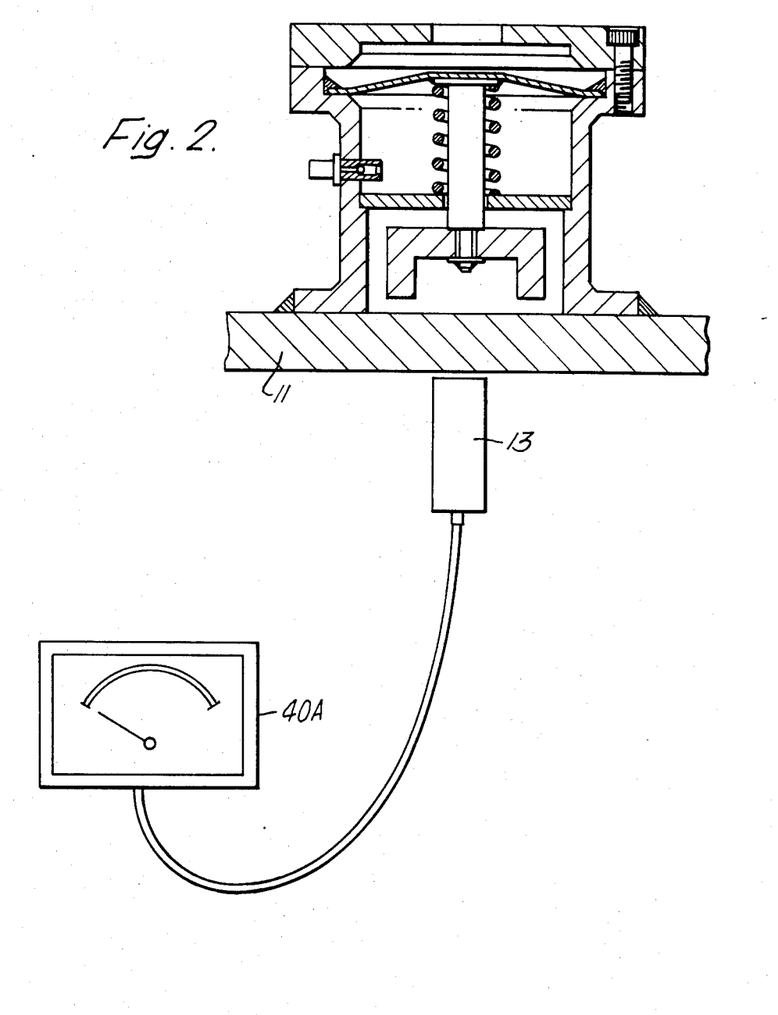
FIG. 2 is an axial section through the detector in one condition.
Figure 3:
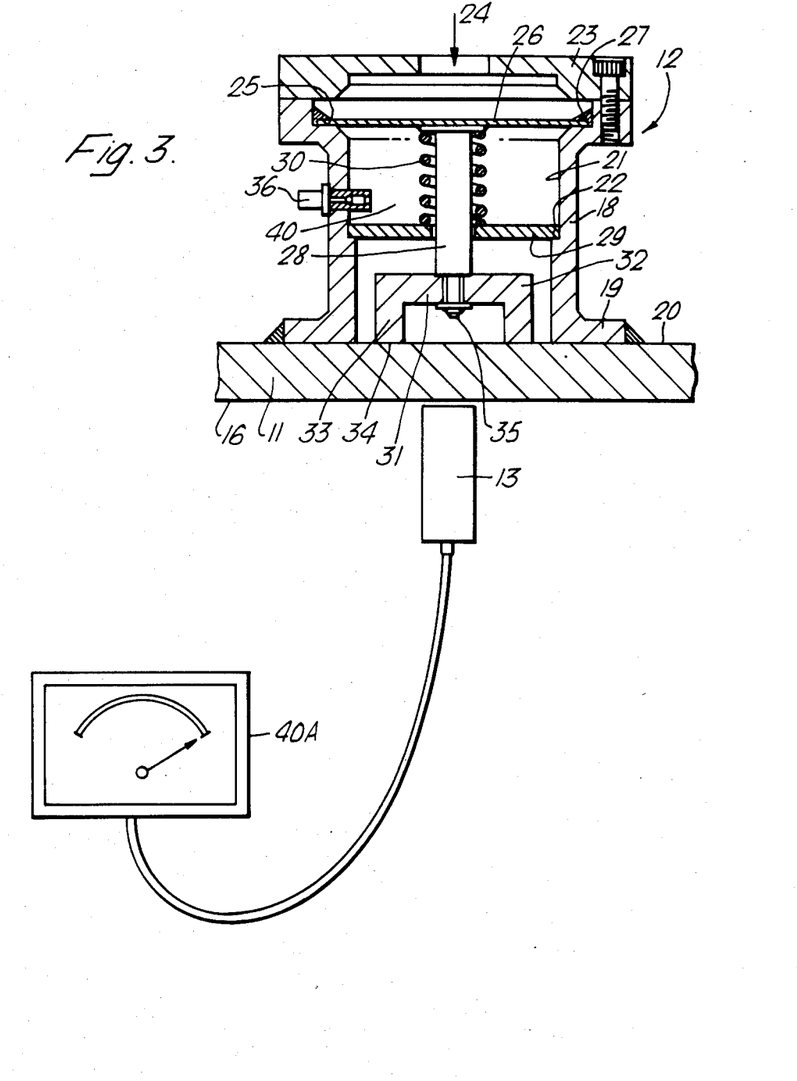
FIG. 3 is a view similar to FIG. 2 with the detector in another condition.

Referring to FIGS. 1 to 3, a metal container 10 adapted to have an internal pressure greater than atmospheric has an upper wall 11 to the inside of which is fixed a detector unit 12. A detector head 13 is mounted on structure 14 forming part of a grab 17 and has a spring-loaded nose 15 for bearing against the wall 11 and ensuring that the head 13 is properly located with respect to to the external surface 16 of the wall 11 opposite the detector 12. A grab or other means is shown schematically at 17 and is adapted to rotate through 360° about the axis of stationary container 10 so that the head 13 sweeps around the wall 11. As described with reference to FIG. 8, the grab 17 may form part of a container handling machine in a storage and monitoring facility.

Figure 3A:
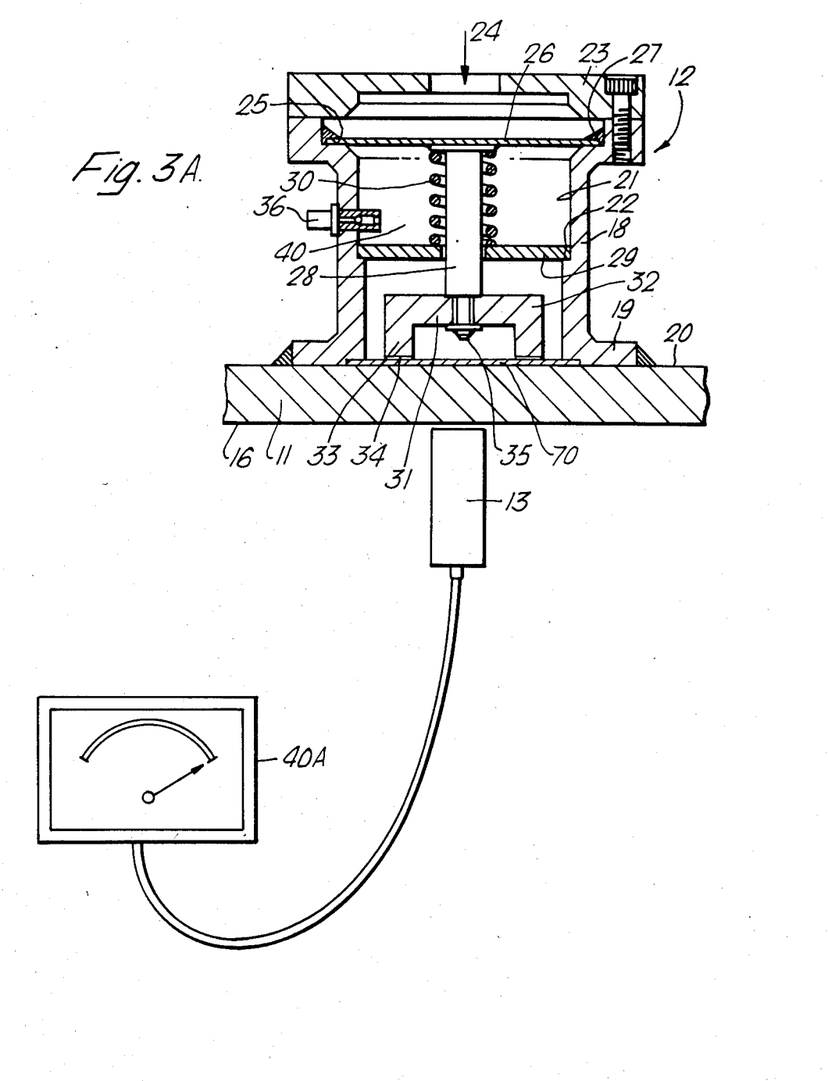
FIG. 3A is a fragmentary view similar to FIG. 3 but showing a modification.

The detector unit 12 comprises a generally tubular member 18 having at one end an outward flange 19 welded to the inner surface of the wall 11 in air-tight manner. The internal surface 21 of the member 18 is stepped to provide an annular shoulder 22 intermediate the ends of the member, the outer end of which has bolted thereto an annular protective cover 23 providing a central mouth or inlet aperture 24. The surface 21 is stepped also adjacent the plate 23 to provide another shoulder 25. A circular flexible diaphragm 26 has its annular outer marginal portion in engagement with the shoulder 25 and is welded in place at 27 in air-tight manner. An axial rod 28 is fixed to the diaphragm 26 on the side opposite the mouth 24 and extends towards the wall 11 passing through a central aperture in an annular plate 29 which abuts the shoulder 22 and through a compression spring 30 which extends between the diaphragm 26 and the plate 29 to hold the plate 29 against the shoulder 22. The rod 28 at its end nearer the wall 11 has a threaded portion of reduced section which engages in a threaded central passage in the base 31 of a horseshoe permanent magnet 32 having arms 33 with ends 34. A nut 35 holds these parts together. The container and, in particular, the wall 11 may be fabricated from a ferromagnetic material such as mild steel in which case the wall 11 in effect acts as a keeper for the magnet 32. Alternatively, the container may be fabricated from a magnetically characterless metal such as a stainless steel. In the latter case, a keeper may be provided if desired and, as shown in FIG. 3A, it may be secured to, or form part of, the tubular member 18, the keeper being depicted by reference numeral 70. Where the wall 11 acts as a keeper or where a keeper 70 is provided, direct contact between the poles of the magnet 32 and the keeper may be undesirable because of the affects of residual magnetism in the keeper and consequently some form of non-magnetic spacer (not shown) may be interposed between the magnet and the keeper.

The wall 18 includes a one-way valve 36 permitting the sealed chamber 40 in member 18 to be pressurized to a desired or datum pressure. The chamber 40 may be prepressurized prior to installation of the device 12 into the container. However, the inclusion of the one-way valve 36 provides the possibility of repressurising the chamber 40 subsequently, should this be necessary, with the device 12 in situ, i.e. by pressurising the interior of the container to the level necessary to pressurise chamber 40 to the required extent.

In the position shown in FIG. 3, the container 10 is pressurized to the desired internal pressure and the diaphragm 26 is flat, the poles of the magnet 32 engaging the wall surface 20. In the position shown in FIG. 2, the pressure in container 10 is below the desired or datum pressure, resulting in expansion of the spring 30 which moves the magnet 32 away from the surface 20. The loss of internal pressure in the container 10 may be the result of a gas leak from the container and this causes movement of the magnet 32.

When the magnet 32 is in the FIG. 3 position, the magnetic field induced in the wall 11 and the external or stray magnetic field outside the wall 11 are greatest, and are greater than with the magnet 32 in the FIG. 2 position. This change of magnetic flux is detected by detector head 13 and the magnetic flux may be displayed on a fluxmeter 40A connected to the head 13. The fluxmeter takes the form of a voltmeter displaying a voltage directly proportional to the magnetic flux. The voltmeter may be of digitial form ("magnet present" or "magnet absent") but in suitable circumstances an analogue voltage reading could be displayed so as to measure pressure directly.

Instead of a diaphragm 29, a bellows may be used. The container 10, or at least the wall 11, may be of diamagnetic, paramagnetic or ferromagnetic material and the apparatus can be used to detect discrete changes in pressure or absence of pressure in the container.

The magnet 32 can take various forms and configurations, eg a bar magnet or magnets. The bar magnet could be disposed at right angles to the wall 11, with the outer end connected to the rod 28, or parallel to the wall 11, the latter being somewhat similar to the horseshoe magnet arrangement but having less measured flux and more pull-off force than the magnet at right-angles.

Preferably the magnet has both of its poles presented towards the wall 11 as shown in the illustrated embodiment, the poles being spaced apart in the direction of scan by the detector head 13 which assists precise location of the magnet since the two poles will give rise to opposite flux changes as the detector head scans across the magnet 32.

Figure 4:
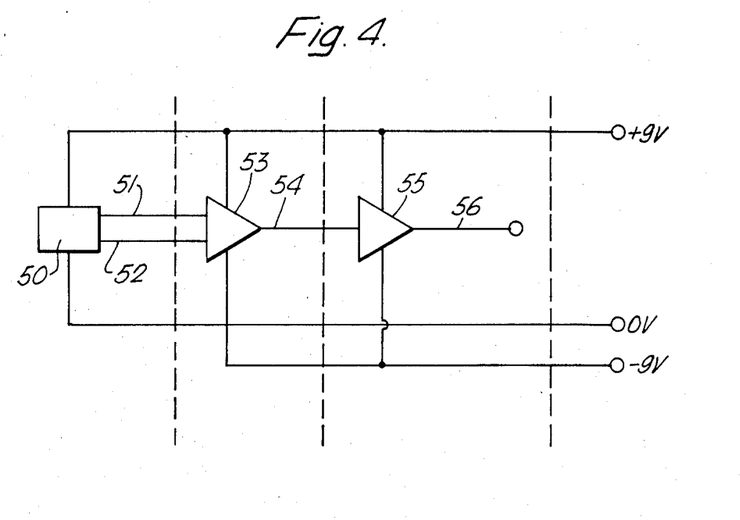
FIG. 4 is a circuit.

The detector head 13 responsive to the change in magnetic flux preferably comprises a Hall effect transducer, preferably incorporating a suhl effect semiconductor, which is responsive to the leakage flux outside the wall 11. FIG. 4 shows a suitable arrangement in which a linear Hall effect device 50 has an output on lines 51, 52, connected to a differential amplifier 53 which has an output on line 54 to an inverting amplifier 55 including a zeroing circuit and an output on line 56 leading to fluxmeter (voltmeter) 40A. A battery power supply is used.

Figure 5:
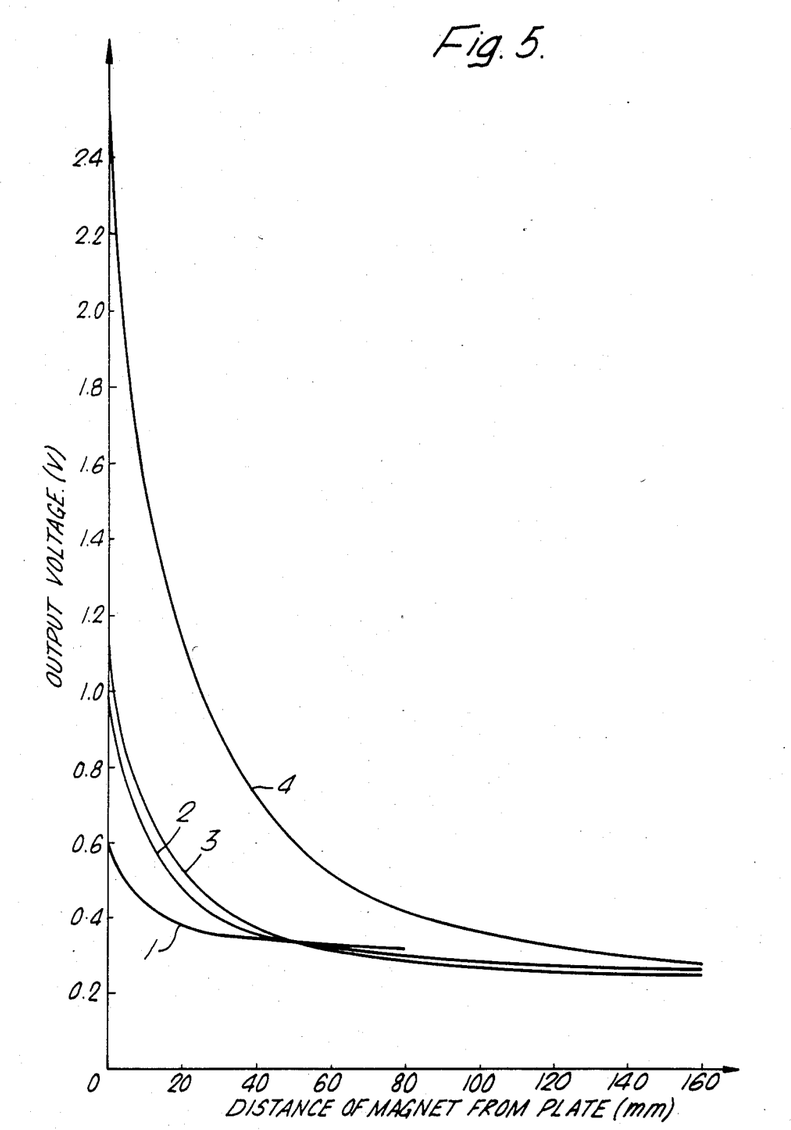
FIG. 5 is a graph showing variations in output from a detector head.
Figure 6:
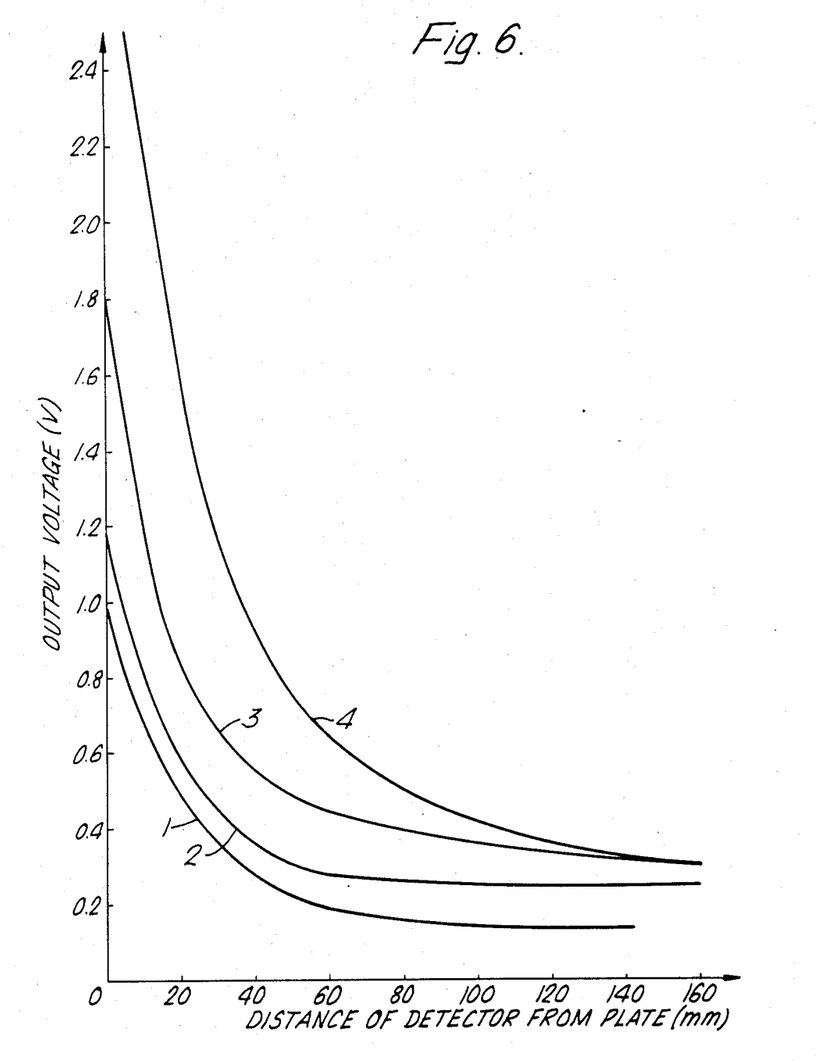
FIG. 6 is a graph showing further variations in output.

FIG. 5 shows the voltage output on line 56 for differing distances of four different magnets from the surface 20, and FIG. 6 shows the voltage output on line 56 for varying distances of the Hall effect device 50 from the surface 16 with the respective magnet engaging the surface 20.

The device 12 is designed to be fail-safe. Thus, if pressure is lost in chamber 40 in member 18, the spring 30 alone develops sufficient power to move the magnet 32 to the FIG. 2 position if pressure is lost in the vessel 10. On the other hand, if there is a loss of spring compression, the differential pressure between the sealed chamber 40 and the interior of the vessel 10 is designed to develop sufficient power to move the magnet 32 to the FIG. 2 position if the pressure in the container 10 falls below the datum pressure. Two detectors and associated detector heads could be used to reduce the risk of overall failure.

To avoid dissimilar welds, the member 18 is of the same material as the container wall 11, e.g. mild steel.

If the magnet 32 loses some or all of its magnetism due to rise in temperature eg. above 500° C., the spring 30 and/or the pressure in chamber 40 will cause magnet 32 to move thus enabling this condition to be detected.

In a modification applicable to situations in which the container is fabricated from a magnetically soft material (such as mild steel or where a separate keeper is employed as in FIG. 3A), the detector detects the unidirectional flux within the wall 11 by superimposing a time-varying flux onto the unidirectional flux and measuring the resultant interaction. Ideally the resultant flux should be measured within the wall 11 but, since this is not practicable it is proposed to measure the interaction in a secondary iron circuit by suing a search coil.

Figure 7:
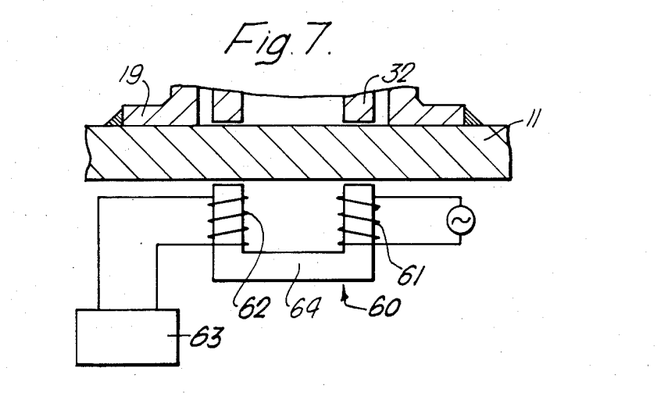
FIG. 7 is a view similar to FIG. 3 of another arrangement.

It is considered that this method will have greater sensitivity since it is measuring the flux in the wall directly, rather than the associated leakage flux. The development of the alternative method may permit the device to be used as a pressure transducer as opposed to a pressure detector. One possibility is shown in FIG. 7 and in this the detector head 60 is in the form of a coil 61 wound on one arm of a core 64 and energized from an AC source and producing an alternating magnetic field in wall 11, which field interacts with the magnetic field in the wall 11 from the magnet 32. A sensor or search coil 62 responds to changes in magnetic field outside the wall 11 due to the interacting magnetic fields in the wall 11 and has an output connected to a detector unit 63. The output from the sensor coil 62, also wound on core 64, is an alternating voltage whose magnitude and wave shape are dependent on the magnitude of the unidirectional flux produced by the permanent magnet 32. There would be a secondary effect of a small induced voltage due to the movement of the permanent magnet. This is not considered to be of any significance because of its small magnitude and the fact that the detector may not necessarily be present at the moment of operation (e.g. the detector may be mounted on the grab of a crane). The detector unit 63 may comprise a sensitive ac voltage detector, an amplifier, a scaler and a display device.

Figure 8:
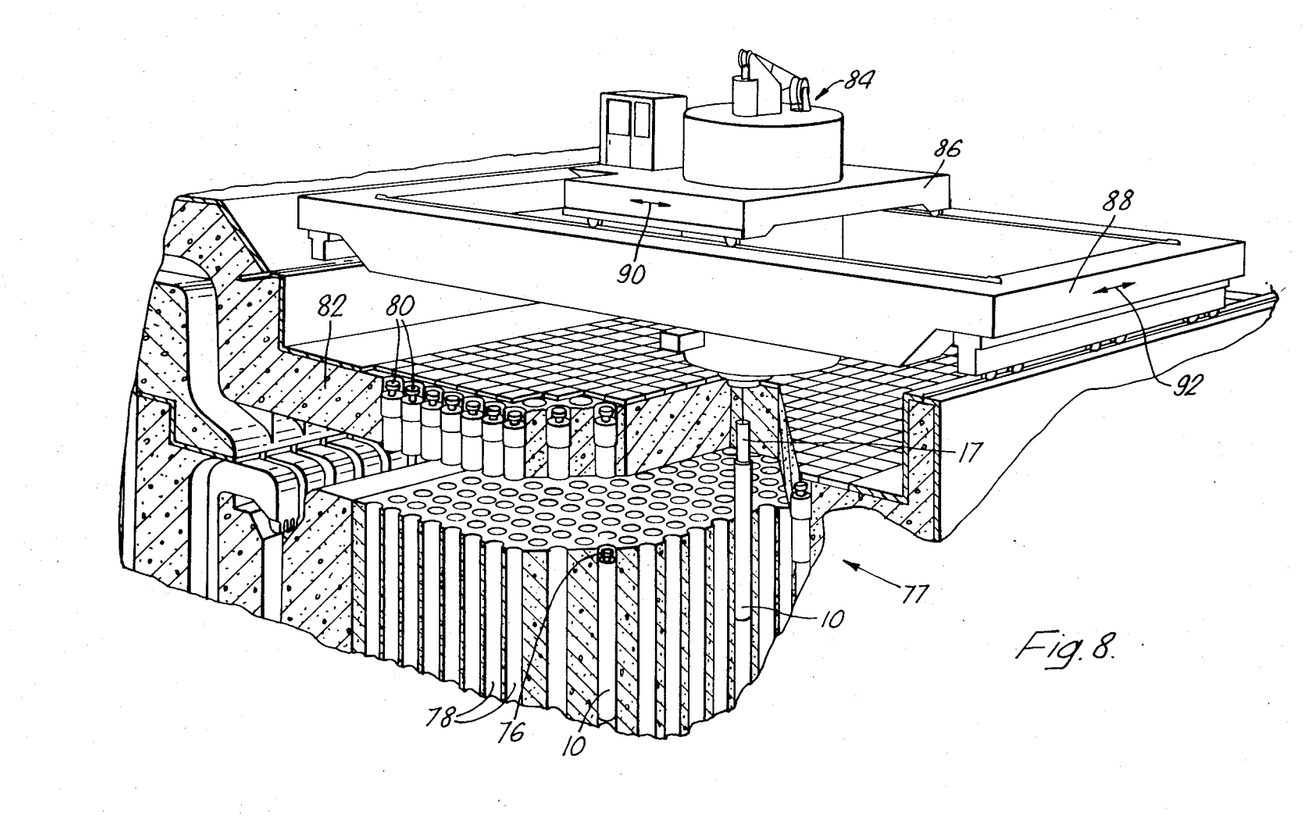
FIG. 8 is a schematic partly broken away perspective view illustrating a storage facility.

The container shown in FIG. 1 is intended for the long term storage of nuclear fueld materials in the form of, for example, fast reactor fuel sub-assemblies. The sub-assembly is introduced into the container via opening 74, a valve and handling unit 76 is then welded to the container and the container is pressurised via the valve unit to a pressure above atmospheric pressure. The container can thereafter be loaded into a storage facility such as that shown in FIG. 8. The facility container and the container is pressurised via the valve unit to a pressure above atmospheric pressure. The container can thereafter be loaded into a storage facility such as that shown in FIG. 8. the facility comprises a vault 77 in the form of an array of container channels 78 which may comprise steel tubes supported in a concrete structure and accessible via removable plugs 80 in a shield structure 82. A container handling machine 84 is provided above the shield structure 82 and is mounted on carriages 86, 88 movable in mutually orthogonal directions 90, 92 to enable the grab 17 of the machine to be moved across the array. In FIG. 8, the machine is shown lowering a container 10 into a channel 78, the grab being engaged with the valve and handling unit 76.

The grab 17 includes a sniffing device (not shown) as well as detector head 13, the sniffing device being operable to detect for example fission gas release via the valve unit 76. Thus, in use, the machine 84 may be used to periodically examine each container 10 stored in the vault by means of detector head 13 and for fission gas leakage.

We claim:

1. A vessel provided internally with a device for enabling external detection of pressure drop within the vessel, said device comprising a permanent magnet, means mounting the magnet within the vessel for movement toward and away from a boundary wall of the vessel, means for translating the internal pressure within the vessel into a force which, together with the magnetic force developed by the magnet, maintains the magnet in a predetermined position with respect to said boundary wall of the vessel, the magnet being located and arranged such that it is magnetically urged toward said predetermined position, and means responsive to the internal pressure for urging the magnet away from said predetermined position whereby, in the event of a substantial drop in pressure within the vessel, the latter means becomes effective to displace the magnet relative to said boundary wall to vary the magnetic field strength detectable by detector means located on the external side of the boundary wall.

2. A vessel as claimed in claim 1 in which said vessel wall is composed of a magnetically soft material and the magnet is urged by magnetic force and by said pressure-translating means to bear against said wall, and in which the urging means develops sufficient power to move the magnet away from said boundary wall in the event of a substantial drop in internal pressure.

3. A storage and monitoring facility for spent nuclear fuel material comprising at least one vessel as claimed in claim 2, and detector means external to the vessel and responsive to changes in magnetic flux caused by movement of said permanent magnet relative to said boundary wall of the vessel.

4. A facility as claimed in claim 3 in which said detector means is operable to induce a time-varying magnetic flux in said vessel boundary wall for superimposition on the steady state magnetic flux of the permanent magnet in said boundary wall or said element and to measure changes resulting from movement of the magnet relative to said boundary wall.

5. A vessel as claimed in claim 1 in which a magnetically soft element determines said predetermined position, said element being fixed against movement with respect to said boundary wall, in which said pressure-translating means urges the magnet into contact with said element and in which the urging means develops sufficient power to move the magnet away from said element in the event of a substantial drop in internal pressure.

6. A storage and monitoring facility for spent nuclear fuel material comprising at least one vessel as claimed in claim 5, and detector means external to the vessel and responsive to changes in magnetic flux caused by movement of said permanent magnet relative to said boundary wall of the vessel.

7. A facility as claimed in claim 6 in which said detector means is operable to induce a time-varying magnetic flux in said vessel boundary wall for superimposition on the steady state magnetic flux of the permanent magnet in said boundary wall or said element and to measure changes resulting from movement of the magnet relative to said boundary wall.

8. A vessel as claimed in claim 1 in which said urging means is arranged to develop two independent forces acting on said magnet, each force being capable of moving the magnet away from said predetermined position in the event of a substantial pressure drop.

9. A storage and monitoring facility for spent nuclear fuel material comprising at least one vessel as claimed in claim 8, and detector means external to the vessel and responsive to changes in magnetic flux caused by movement of said permanent magnet relative to said boundary wall of the vessel.

10. A vessel as claimed in claim 8 including spring means for developing one of said forces.

11. A storage and monitoring facility for spent nuclear fuel material comprising at least one vessel as claimed in claim 10, and detector means external to the vessel and responsive to changes in magnetic flux caused by movement of said permanent magnet relative to said boundary wall of the vessel.

12. A vessel as claimed in claim 8 including fluid pressure means for developing one of said forces.

13. A storage and monitoring facility for spent nuclear fuel material comprising at least one vessel as claimed in claim 12, and detector means external to the vessel and responsive to changes in magnetic flux caused by movement of said permanent magnet relative to said boundary wall of the vessel.

14. A vessel as claimed in claim 12 in which said fluid pressure means comprises an enclosed volume of pressurized fluid defined, in part, by a flexible wall portion to which the magnet is coupled, said enclosed volume being chargeable with pressure fluid via a one way valve.

15. A vessel as claimed in claim 1 in which said boundary wall is constituted by a top wall portion of the vessel.

16. A storage and monitoring facility for spent nuclear fuel material comprising at least one vessel as claimed in claim 1 and detector means external to the vessel and responsive to changes in magnetic flux caused by movement of said permanent magnet relative to said boundary wall of the vessel.

17. A facility as claimed in claim 16 in which said detector means comprises a Hall effect transducer.

18. A facility as claimed in claim 16 in which a plurality of said vessels are provided, said vessels each incorporating a device as aforesaid and being arranged in an array such that said vessel boundary wall are all accessible at one face of the array, and in which means is provided for moving the detector means from one vessel to another whereby all of the vessels can be periodically monitored.

19. A facility as claimed in claim 18 in which said moving means is operable to bring the detector means into close proximity with said boundary wall of each vessel and scan the detector means over said wall.

20. A vessel provided internally with a device for enabling external detection of pressure drop within the vessel, said device comprising a permanent magnet, means mounting the magnet within the vessel for movement toward and away from a boundary wall of the vessel, means for translating the internal pressure within the vessel into a force which urges the magnet into a predetermined position with respect to said boundary wall of the vessel, and means responsive to the internal pressure for urging the magnet away from said predetermined position whereby, in the event of a substantial drop in pressure within the vessel, the latter means becomes effective to displace the magnet relative to said boundary wall to vary the magnetic field strength detectable by detector means located on the external side of the boundary wall, and in which said urging means is of sufficient power to overcome the force provided by the pressure-translating means and move the magnet from said predetermined position if the magnetism of the magnet decreases by more than a predetermined amount as a result of temperature increase within the vessel.

* * * * *